United States Patent [19]
Edgar

[11] 3,793,659
[45] Feb. 26, 1974

[54] THREAD RE-FORMING TOOL

[76] Inventor: Lawrence E. Edgar, 961 E. Bennett, Glendora, Calif. 91740

[22] Filed: May 16, 1972

[21] Appl. No.: 253,792

[52] U.S. Cl. .................... 10/1 B, 10/111, 10/123 P
[51] Int. Cl. ............................................. B23g 5/00
[58] Field of Search .. 10/1 B, 111, 120, 123, 123 P; 30/94; 72/703; 408/215, 218

[56] References Cited
UNITED STATES PATENTS

| | | | |
|---|---|---|---|
| 1,017,403 | 2/1912 | Garbarino et al. ..................... | 10/1 B |
| 1,754,489 | 4/1930 | Stevenson ............................. | 10/1 B |
| 2,508,291 | 5/1950 | Porro .................................... | 10/1 B |
| 3,567,849 | 9/1951 | LeBron et al. ........................ | 10/1 B |

Primary Examiner—Charles W. Lanham
Assistant Examiner—E. M. Combs
Attorney, Agent, or Firm—William W. Haefliger et al.

[57] ABSTRACT

Apparatus for re-forming the thread of a fastener defining as an axis, comprises a. a support b. multiple jaws having edges tapered for forcible reception in the thread defined groove at opposite sides of the fastener when the fastener is located in a zone formed between the jaws whereby the jaws may re-form the thread when rotated relatively about the fastener, one of the jaws carried by the support, c. and means on the support mounting another of the jaws for adjustment along another axis extending generally toward said one jaw but eccentrically relative to the fastener axis, and for rotation about said other axis to fit the thread groove for thread re-forming.

4 Claims, 4 Drawing Figures

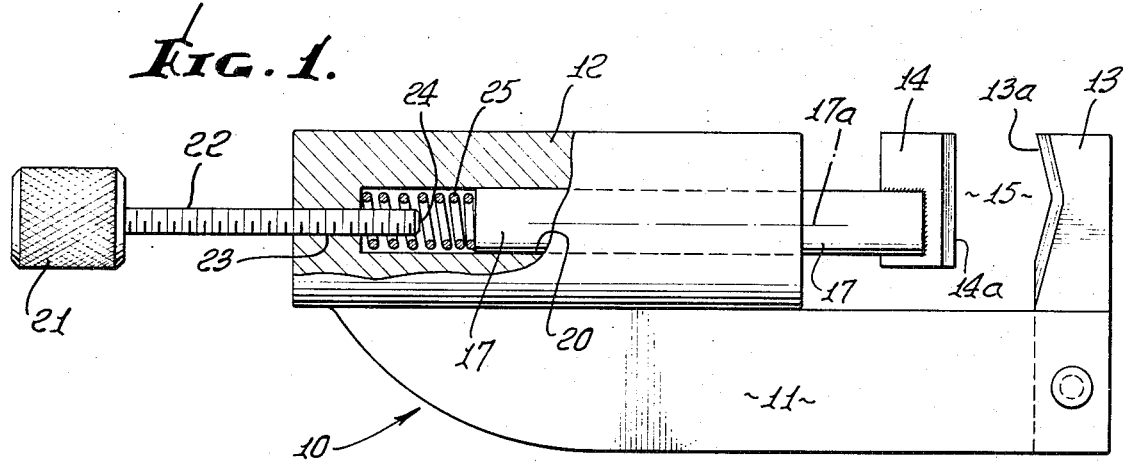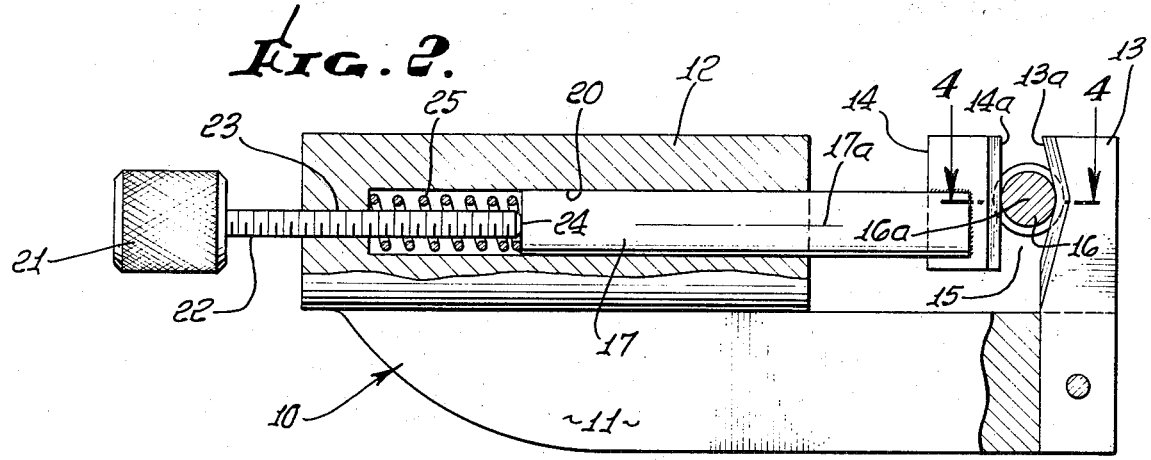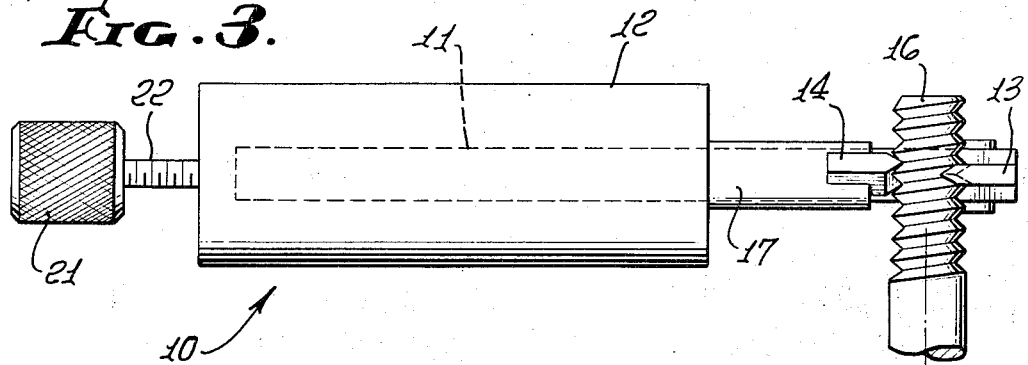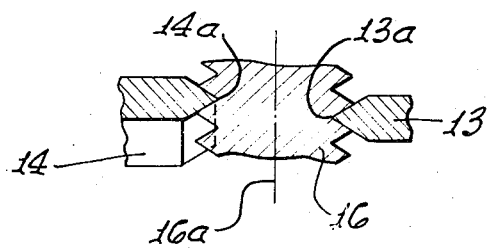

THREAD RE-FORMING TOOL

BACKGROUND OF THE INVENTION

This invention relates generally to thread re-forming, and more particularly concerns the provision of a simple, easily adjusted tool for carrying out this operation.

It frequently happens that the threads of metallic bolts and other type fasteners become deformed to the extent that nuts cannot be advanced or tightened on the bolts. Thread re-forming then becomes necessary; however, to my knowledge no available tool has the unusual advantages in structure, function and results as now afforded by the re-forming tool described herein.

SUMMARY OF THE INVENTION

It is a major object of the invention to provide a thread re-forming tool of simple, effective design and capable of rapid adjustment to bolts and fasteners of different sizes. Basically the device comprises a support; multiple jaws having edges tapered for forcible reception in the thread defined groove at opposite sides of the fastener when the fastener is located in a zone formed between the jaws whereby the jaws may re-form the thread metal when rotated relatively about the fastener; one of the jaws being carried by the support; and means on the support mounting another of the jaws for adjustment along another axis extending generally toward the one jaw but eccentrically relative to the fastener axis, and for rotation about that other axis to fit the thread groove for thread re-forming. Such means may include a shaft carrying the other jaw and defining the other axis, and structure forming a bore receiving the shaft and a manually rotatably adjustable member having threaded connection with the structure and operatively connected with the shaft for adjusting it lengthwise. This construction tends to prevent the shaft from rotating during jaw clamping of the fastener for thread re-forming.

Further, the other jaw may have fastener engaging main extent offset relative to the other axis; the one jaw may be fixed relative to the support; and the tapered edge of a selected jaw may be concave to fit the thread groove along its convexly curved length.

These and other objects and advantages of the invention, as well as the details of an illustrative embodiment, will be more fully understood from the following description and drawings, in which:

DRAWING DESCRIPTION

FIG. 1 is a front elevation, partly broken away;
FIG. 2 is a view like FIG. 1, but showing a fastener thread gripped by the tool;
FIG. 3 is a top plan view of the FIG. 2 tool; and
FIG. 4 is a section taken on lines 4—4 of FIG. 2.

DETAILED DESCRIPTION

The tool or apparatus shown in FIG. 1 comprises support 10 which may include a base 11 and a cylinder 12 mounted thereon as shown, these elements being horizontally elongated.

Multiple jaws such as those indicated at 13 and 14 define a zone 15 between them to receive a threaded fastener, as appears at 16 in FIG. 2. The latter has an axis indicated at 16a. One of the jaws, as for example jaw 13, is carried by the support to project upwardly, and means on the support mounts the other jaw for adjustment along another axis, as for example the axis 17a of a shaft 17, and toward the jaw 13.

The jaws have edges 13a and 14a which are elongated generally vertically, and which taper laterally oppositely toward one another for forcible reception in the groove 19 defined by the fastener thread 20, as is clear from FIG. 4. For this purpose, jaw 14 is rotatable about axis 17a so as to accurately fit the groove for thread re-forming. The cylinder 12 defines a bore 20 into which the shaft 17 fits for guiding its rotation about axis 17a. Further, a manually rotatably adjustable member includes a knob 21 and a shank 22 having threaded connection at 23 to the cylinder to provide operative connection to the shaft 17 for adjusting the shaft lengthwise thereby to secure jaw clamping and release of the threaded fastener 16. For example, when the end 24 of shank 22 is retracted from the shaft urged to the right by compression spring 25 in bore 20, the shaft and jaw 14 may be retracted to the left to enlarge zone 15 for reception of a fastener to be subjected to thread re-forming. Thereafter, turning of knob 21 to advance shank 22 to the right ultimately effects displacement of the shaft and jaw 14 to the right to clamp the fastener as in FIG. 2. Simultaneously, manual turning of that jaw slightly about axis 17a secures accurate fitting of that jaw into the appropriate thread groove extent, as in FIGS. 3 and 4. It will be noted that the tapered edge 13a of jaw 13 is concave in a vertical plane, i.e. lengthwise of that edge, to fit into the thread groove along the convexly curved length thereof, for most efficient re-forming action.

Important features of the invention are the offsetting of the axes 16a and 17a so as not to intersect, and the offsetting of the fastener engaging extents of the jaws from axis 17a, i.e. above that axis in the drawings. As a result, the loading imposed on the shaft when the jaws clamp a fastener results in frictional binding of that shaft in the bore 20, resisting rotation of the shaft and rigidizing the relative position relationship of the jaws as is desired during thread re-forming. The latter is carried out by relatively rotating the fastener and tool about axis 16. Note that in the example shown the taper of the thread, and jaw taper, is 60°; however, other tapers of the thread and jaws is of course possible.

I claim:

1. In apparatus for re-forming the thread of a fastener having an axis, the combination comprising
   a. a support
   b. multiple jaws having edges tapered for forcible reception in the thread defined groove at opposite sides of the fastener when the fastener is located in a zone formed between the jaws whereby the jaws may re-form the thread when rotated relatively about the fastener, one of the jaws carried by the support,
   c. and means on the support mounting another of the jaws for adjustment along another axis extending generally toward said one jaw but eccentrically relative to the fastener axis, and for rotation about said other axis to fit the thread groove for thread re-forming, said means including a shaft carrying said other jaw and defining said other axis about which said shaft and other jaw are freely rotatable during thread re-forming, the edge of said one jaw having V-shape to fit into the thread groove at multiple locations and defining an apex which is eccentrically offset from said other axis, and the edge of said other jaw being linearly straight.

2. The combination of claim 1 wherein said support includes structure defining a bore receiving the shaft for rotation about said other axis, and a manually rotatably adjustable member having threaded connection with said structure and operatively connected with the shaft for adjusting the shaft lengthwise of said other axis.

3. The combination of claim 1 wherein the other jaw has fastener thread engaging main extent which is offset relative to the other axis, said axes being non-intersecting.

4. The combination of claim 1 wherein said one jaw is fixed relative to the support.

* * * * *